United States Patent [19]

Tsuyama et al.

[11] Patent Number: 5,193,061
[45] Date of Patent: Mar. 9, 1993

[54] SLIP CONTROL MECHANISM OF A MOTOR VEHICLE

[75] Inventors: Toshiaki Tsuyama, Higashi-Hiroshima; Kazutoshi Nobumoto, Hiroshima; Fumio Kageyama, Hiroshima; Akira Sone, Hiroshima; Makoto Kawamura, Hiroshima, all of Japan

[73] Assignee: Mazda Motor Corporation, Hiroshima, Japan

[21] Appl. No.: 621,963

[22] Filed: Dec. 4, 1990

[30] Foreign Application Priority Data

Dec. 6, 1989 [JP] Japan .................. 1-317073

[51] Int. Cl.$^5$ .............................................. B60T 8/32
[52] U.S. Cl. .............................. 364/426.02; 180/197
[58] Field of Search ............ 364/426.01, 426.03; 180/197

[56] References Cited

U.S. PATENT DOCUMENTS

| | | | |
|---|---|---|---|
| 4,484,280 | 11/1984 | Brugger et al. | 364/426 |
| 4,788,644 | 11/1988 | Inagaki | 364/426.03 |
| 4,850,446 | 7/1989 | Leiber et al. | 180/197 |
| 4,854,411 | 8/1989 | Ise | 180/197 |
| 4,860,847 | 8/1989 | Shiraishi et al. | 180/197 |
| 4,939,656 | 7/1990 | Hoashi et al. | 364/426.02 |
| 4,962,824 | 10/1990 | Hagiya et al. | 180/197 |
| 5,002,148 | 3/1991 | Miyake et al. | 180/197 |
| 5,019,989 | 5/1991 | Veda et al. | 364/431.05 |
| 5,041,978 | 8/1991 | Nakayama et al. | 364/426.03 |

FOREIGN PATENT DOCUMENTS

| | | |
|---|---|---|
| 3546575 | 10/1987 | Fed. Rep. of Germany . |
| 3807758 | 9/1988 | Fed. Rep. of Germany . |
| 3812599 | 11/1988 | Fed. Rep. of Germany . |
| 3818511 | 12/1988 | Fed. Rep. of Germany . |
| 3728572 | 3/1989 | Fed. Rep. of Germany . |
| 58-16948 | 1/1983 | Japan . |

Primary Examiner—Thomas G. Black
Attorney, Agent, or Firm—Keck, Mahin & Cate

[57] ABSTRACT

A slip control mechanism of a motor vehicle has a brake provided for each driving wheel, a first detection device means for detecting slip of each driving wheel, a second detection device for detecting if a predetermined condition has been met during a starting period of the vehicle, and a slip control device for operating the brake for providing each driving wheel with braking force when an excessive slip is detected, based on signals from the first detection device, to thereby eliminate such excessive slip. The slip control device controls the brake for the respective driving wheels whereby substantially the same amount of braking force is applied to the driving wheels when the second detection device detects that the predetermined condition is not met. The slip control device also controls the brake for the respective driving wheels independently in accordance with signals from the first detecting device when the second detecting device detects that the predetermined condition is met.

4 Claims, 8 Drawing Sheets

SLIP CONTROL MECHANISM OF A MOTOR VEHICLE

BACKGROUND OF THE INVENTION

1. Field of the Invention

The present invention relates to a slip control mechanism of a motor vehicle.

2. Description of Related Art

There has already been proposed to provide a motor vehicle with an electronic traction control system which is intended to control the slip value between motor-driven wheels, hereinafter called driving wheels, of the vehicle and the surface on which the wheels operate. Such a traction control system may be referred to as a vehicle slip control system. It has been believed that the slip control system can assure stability and maneuverability of the vehicle during starting and cruising. Vehicle acceleration can also be improved through an appropriate control of the slip value.

When an acceleration pedal of the vehicle is excessively depressed, the driving torque applied to the driving wheels will become excessive so that the slip value between the wheels and the wheel supporting surface will be increased, resulting in a decrease in the stability, the maneuverability, and the acceleration at the starting of the vehicle.

In order to control the slip value, various operation factors of the vehicle are detected. Such operation factors may include an acceleration rate of a driving wheel and a vehicle running speed. There is provided an electronic controller which is adapted to perform calculations based on the detected vehicle operation factors to obtain the slip value of the driving wheel. The slip value thus obtained is compared with a reference value to determine if the actual slip value is acceptable or not. There is provided means for restricting the driving force which is applied to the driving wheel when it is found that there exists an excessive slip value.

There are two ways of restricting the driving force which is applied to the driving wheels while the acceleration pedal is being maintained in a depressed position. One way is to restrict the output of the engine, and the other is to have a brake applied to the slipping wheel. One of the slip control mechanisms which adopts the latter way is disclosed in Japanese Patent Laid-Open Publication No. 58-16948. In this slip control mechanism, the respective slip values of the right and left driving wheels are detected independently, and, in accordance with the respective slip values of the right and the left driving wheels, the brake control is carried out independently on the right and the left driving wheels so as to control the excessive slip.

However, the above slip control mechanism has the following problem. That is, if the brake control is carried out independently on the right and the left driving wheels in accordance with the respective slip values of the right and the left driving wheels, the stability of the vehicle may decrease, especially in the initial accelerating stage just after the starting of the vehicle, because of the difference between the respective driving forces applied to the right and the left driving wheels.

SUMMARY OF THE INVENTION

It is, therefore, the object of the present invention to provide a slip control mechanism which is adapted to carry out brake control for controlling the excessive slip, wherein the stability of the vehicle does not decrease in the initial accelerating stage just after the starting of the vehicle.

In accordance with the present invention, there is provided a slip control mechanism of a motor vehicle comprising brake means provided for each driving wheel, first detection means for detecting slip of each driving wheel, second detection means for detecting that a predetermined condition has been met during a starting period of the vehicle, and slip control means for operating the brake means for providing each driving wheel with braking force when an excessive slip is detected, based on signals from the first detection means, to thereby eliminate such excessive slip. The slip control means controls the brake means for the respective driving wheels so that substantially the same amount of braking force is applied to the driving wheels when the second detecting means detects that the predetermined condition is not met. The slip control means also controls the brake means for the respective driving wheels independently in accordance with signals from the first detecting means when the second detecting means detects that the predetermined condition is met.

According to the above features, each driving wheel is provided with the same amount of braking force until the vehicle reaches the predetermined condition, so that the stability of the vehicle does not decrease in the initial accelerating stage just after the starting of the vehicle.

According to a preferred embodiment of the present invention, the braking force which is applied to the respective driving wheels when the predetermined condition is not met is determined based on the largest slip value of the driving wheels.

According to another preferred embodiment of the present invention, the second detection means detects that a predetermined period of time has passed after the starting of the vehicle.

According to still another preferred embodiment of the present invention, the second detection means detects that an acceleration of the vehicle has reached a predetermined value.

According to another preferred embodiment of the present invention, the second detection means detects that a speed of the vehicle has reached a predetermined value.

DESCRIPTION OF THE PREFERRED EMBODIMENTS

Figure 1:
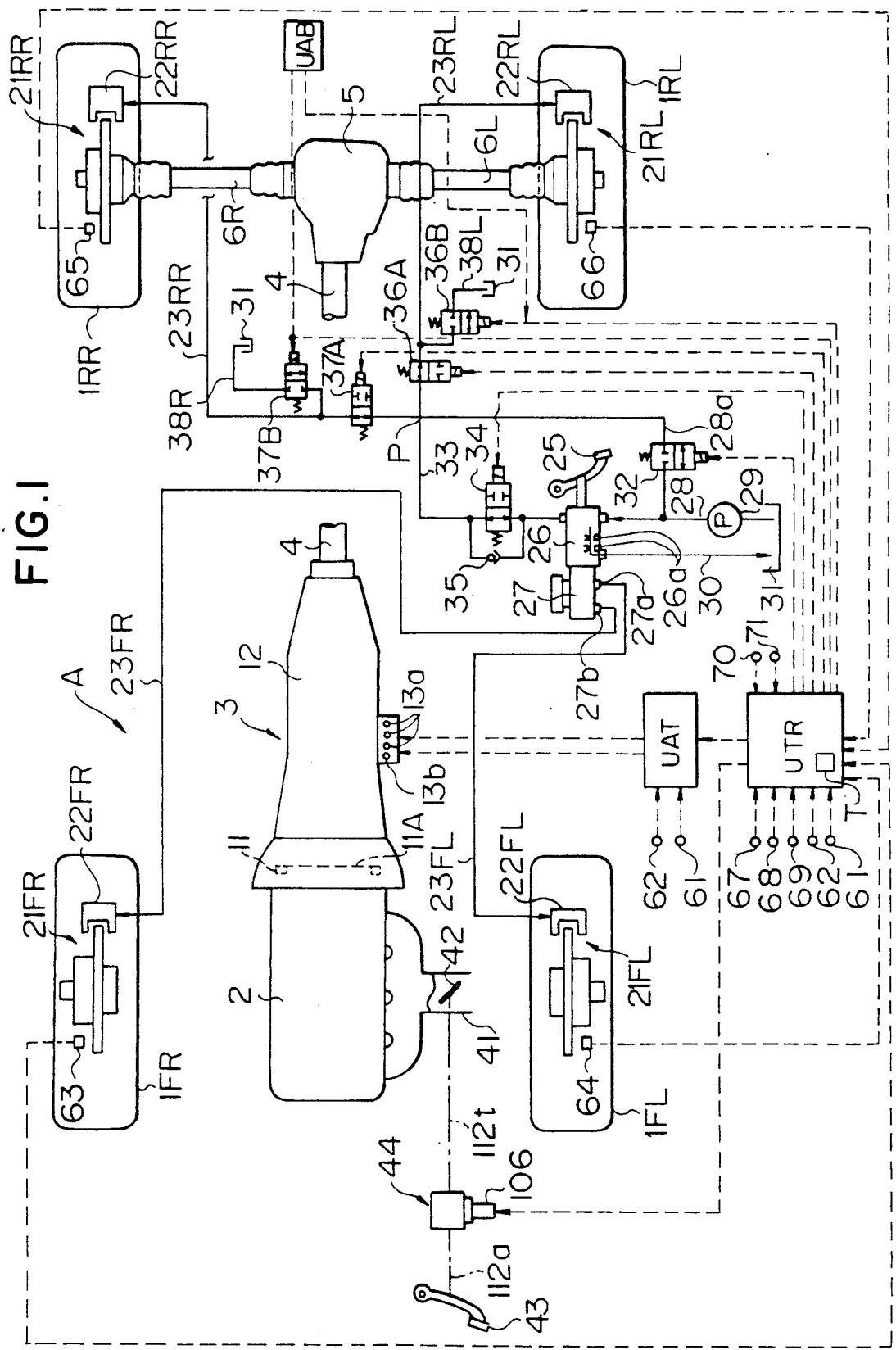
FIG. 1 is a general diagram of a slip control mechanism in accordance with the present invention.

Referring to FIG. 1, there is shown a motor vehicle A having a slip control mechanism in accordance with an embodiment of the present invention. The vehicle A has left and right front wheels 1FL, 1FR for driven wheels, and left and right rear wheels 1RL, 1RR for driving wheels. Driving torque generated by an engine 2 disposed in the front portion of the vehicle A is transmitted to the left rear wheel 1RL through an automatic transmission 3, a propeller shaft 4, a differential 5 and a left rear axle 6L, and to the right rear wheel 1RR through an automatic transmission 3, a propeller shaft 4, a differential 5 and a right rear axle 6R.

Construction of the Automatic Transmission

The automatic transmission 3 comprises a torque converter 11 and a multiple-stage transmission gear mechanism 12. Transmission control is carried out by changing combinations of magnetization and demagnetization of a plurality of solenoids 13a which are incorporated in a hydraulic control circuit for the transmission gear mechanism 12. The torque converter 11 has a lockup clutch 11A operated by hydraulic pressure. Connection and disconnection of the lockup clutch 11A is carried out by changing, between magnetization and demagnetization, the operation of a solenoid 13b which is incorporated in a hydraulic control circuit for the lockup clutch 11A.

The solenoids 13a and 13b are controled by a control unit UAT for the automatic transmission 3. The control unit UAT is, as is already known, provided with transmission diagrams and lockup diagrams so as to carry out transmission control and lockup control based on the diagrams. To carry but this control, the control unit UAT receives a throttle opening signal, and a vehicle speed signal (rotation signal of the propeller shaft 4, in this embodiment) respectively from sensors 61, 62.

Construction of Control Mechanism of Hydraulic Pressure for Brake

Each wheel 1FR-1RR is provided with brakes 21FR~21RR respectively. Each caliper (brake cylinder) 22FR~22RR of each brake 21FR~21RR is supplied with hydraulic pressure for the brakes.

The hydraulic pressure is supplied to each brake 21FR~21RR through a mechanism as follows. First, the pressure applied to a brake pedal 25 is increased by amplifying means or a hydraulic booster 26, then transmitted to a tandem type master cylinder 27. The hydraulic pressure transmitted to the master cylinder 27 is then transmitted to the brake 21FL for the front left wheel through conduit 23FL connected to a first outlet 27a of the master cylinder 27, and to the brake 21FR for the front right wheel through conduit 23FR connected to a second outlet 27b of the master cylinder 27.

The hydraulic booster 26 is supplied with the hydraulic pressure from a pump 29 through a conduit 28, and then the residual operating liquid is returned to a reservoir 31 through a plurality of orifices 26a disposed in the hydraulic booster 26 and a return conduit 30. A branch conduit 28a is connected to the conduit 28, and is provided with an electromagnetic closing valve 32. A conduit 33 is connected to the hydraulic booster 26, and is provided with an electromagnetic closing valve 34 and a check valve 35 disposed parallel to the closing valve 34.

The branch conduit 28a and the conduit 33 communicate with each other at a communicating point P and the communicating point P communicates with conduits 23RL, 23RR, respectively, for the rear left and right brakes 21RL, 21RR. The conduits 23RL, 23RR are respectively provided with electromagnetic closing valves 36A, 37A. The conduits 23RL, 23RR are respectively provided with relief conduits 38L, 38R at their positions downstream from the electromagnetic closing valves 36A, 37A. The relief conduits 38L, 38R are respectively provided with electromagnetic closing valves 36B, 37B which operate as outlet valves of the antilock brake system (ABS) under a control unit UAB.

The above mentioned valves 32, 34, 36A, 37A, 36B and 37B are controlled by a control unit UTR for slip control. That is, when the slip control is not carried out, the valves 32, 36B, 37B are closed and the valves 34, 36A, 37A are opened. Thus, when pressure is applied to the brake pedal 25, the front brakes 21FR, 21FL are supplied with hydraulic pressure through the master cylinder 27, and the rear brakes 21RR, 21RL are supplied with the hydraulic pressure of the operating oil of the hydraulic booster 26 through the conduit 33.

As described later, when the slip between the driving wheels or the rear wheels 1RR, 1RL and the road surface becomes large and the slip control is carried out, the valve 34 is closed, while the valve 32 is opened. Then, maintaining, increasing and decreasing of the hydraulic pressure for the brake is carried out by the duty control of the valves 36A, 37A, 36B and 37B. More specifically, on the basis of the valve 32 being opened, the hydraulic pressure for the brake is maintained when the valves 36A, 37A, 36B and 37B are all closed, is increased when valves 36A, 37A are opened and while valves 36B and 37B are closed, and is decreased when valves 36A, 37A are closed and while valves 36B and 37B are opened. The hydraulic pressure in the branch conduit 28a is kept from acting on the brake pedal 25 as a counter force by means of the check valve 35.

When pressure is applied to the brake pedal 25 during the operation of the aforementioned slip control, the hydraulic pressure of the operating oil of the hydraulic booster 26 in response to the pressure applied to the brake pedal 25 is supplied to the rear brakes 21RR, 21RL as the hydraulic pressure for the brakes through the check valve 35.

Construction of a Mechanism for Controlling Engine Torque

The slip control unit UTR decreases the output torque of the engine 2 as well as applies the braking force to the driving wheels 1RL, 1RR so as to decrease the torque supplied to the driving wheels 1RL, 1RR. To this end, a mechanism 44 for controlling the degree of opening of a throttle valve, hereinafter called a throttle opening control mechanism 44, is provided in a connecting mechanism between an accelerator 43 and a throttle valve 42 disposed in an intake passage 41 of the engine 2.

The throttle opening control mechanism 44 will be described hereinafter with reference to FIGS. 2a~2d. Members 112, 113 and 114 are levers slidable to the left and to the right in FIGS. 2a~2d. The lever 112 is connected to the accelerator 43 through an acceleration wire 112a. The lever 113 is biased to the right, the direction for closing the throttle valve 42, by a return spring 121 as well as is connected to the throttle valve 42 through a throttle wire 112t.

The lever 114 has an abutting portion 114a for abutting on the right side of the lever 112 and an abutting portion 114b for abutting on the right side of the lever 113. Disposed between the lever 112 and the lever 114 is a spring 116 for biasing the abutting portion 114a to abut it on the lever 112. In the same way, disposed between the lever 113 and the lever 114 is a spring 122 for biasing the abutting portion 114b to abut it on the lever 113. The biasing force of the spring 116 is set larger than those of the spring 122 and the return spring 121.

The lever 112 is provided with an abutting portion 112b at its right end which restricts the rightward movement of the lever 113 relative to the lever 112 within a predetermined extent.

A lever 111 is disposed on the left of the lever 114. The lever 111 is adapted to be driven to the left and to the right by a motor 106, but leftward movement of the lever 111 is restricted within a predetermined extent by a stopper 123.

The throttle opening control mechanism 44 constructed as described above operates as follows.

Figure 2A:
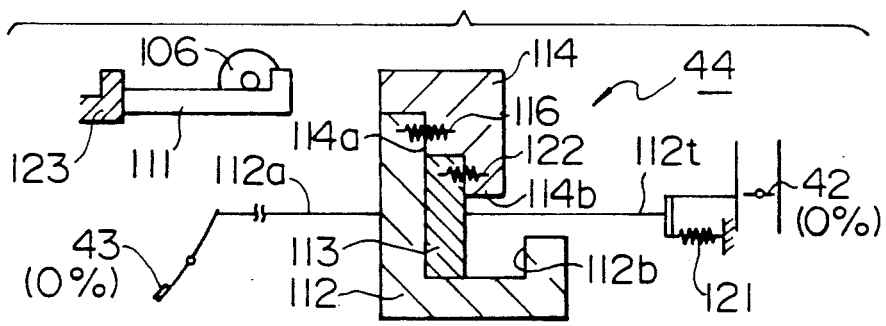
FIGS. 2a–2d are schematic views showing the operation of a throttle opening control mechanism.
Figure 2B:
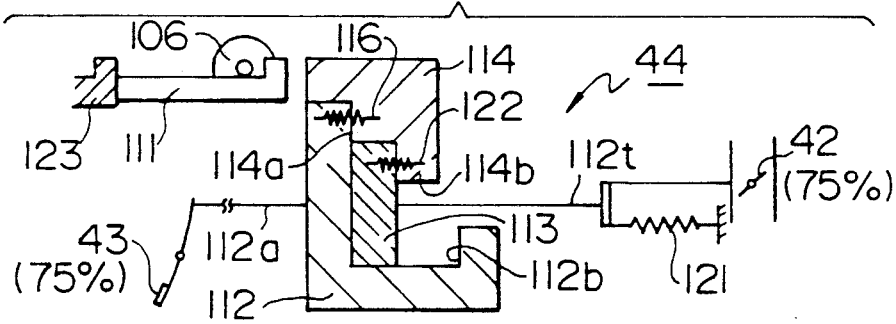

First, there is a condition wherein the lever 111 abuts against the stopper 123. In this condition, the levers 112, 113 and 114 are made integral under the biasing force of the springs 116 and 122 as shown in FIGS. 2a, 2b, so that the degree of opening of the throttle obtained, hereinafter called a throttle opening, is proportional to the degree of opening of the accelerator, hereinafter called an accelerator opening. That is, the throttle opening varies within a range of 0~100% while the accelerator opening varies within a range of 0~100%. FIG. 2a shows a condition wherein the throttle opening is 0%, that is, the accelerator opening is 0%, and FIG. 2b shows a condition wherein the throttle opening is 75%, that is, the accelerator opening is 75%. In the condition of FIG. 2b, there remains a distance between the levers 111 and 114, which is necessary for making the throttle opening vary from 75% to 100%. Thus, the levers 111 and 114 abut against each other when the throttle opening becomes 100%, that is, the accelerator opening becomes 100%.

Figure 2C:
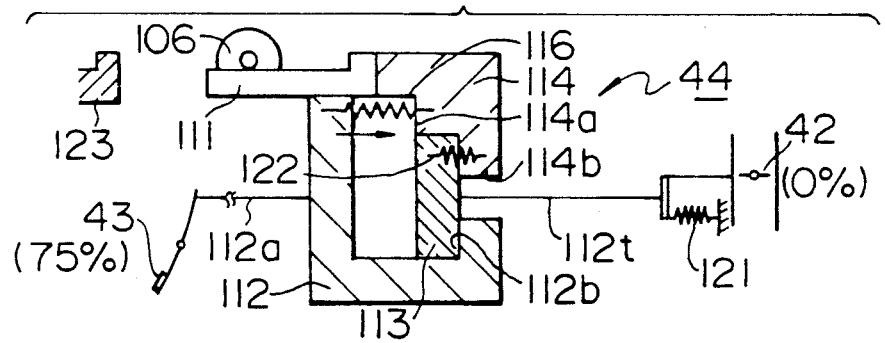
Figure 2D:
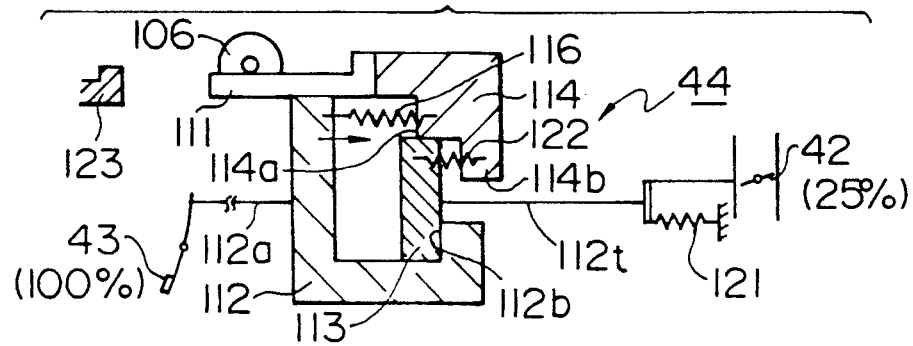

When the lever 111 is driven to the right by the motor 106 in the condition shown in FIG. 2b, the lever 114 is moved to the right against the spring 116 as shown in FIG. 2c. Thus, the throttle opening becomes small, while the accelerator opening remains as it is.

In FIG. 2c, the throttle opening is 0%, that is, the throttle is completely closed, while the accelerator opening is 75%. In this condition, the abutting portion 112b of the lever 112 abuts against the lever 113.

When the accelerator opening is made 100% in the condition shown in FIG. 2c, the lever 112 is moved to the left, and accordingly the lever 113 is moved to the left by the abutting portion 112b. Thus, the throttle opening changes from 0% shown in FIG. 2c to 25% shown in FIG. 2d.

As is clearly understood from the above description, even if the lever 111 becomes stuck in the condition shown in FIG. 2c, the throttle valve 42 can be opened to an opening of 25% by making the accelerator opening 100%, so that the vehicle A can be driven to a repair shop.

Construction of Control Unit

In the slip control, the control unit UTR carries out brake control and engine control by controlling the motor 106 of the throttle opening control mechanism 44. The control unit UTR receives such signals as wheel rotation speed signals from sensors 63~66 for sensing the rotation speeds of the wheels, throttle opening signals from the sensor 61, vehicle speed signals from the sensor 62, accelerator opening signals from a sensor 67, rotation signals of the motor 106 from a sensor 68, steering angle signals from a sensor 69, mode signals from a manual switch 70 and brake signals from a brake switch 71 which is turned on when the brake pedal 25 is pushed.

The control unit UTR further includes input interface for receiving the signals from the sensors, a microcomputer comprising CPU, ROM and RAM, output interface, and circuits for operating the valves 32, 34, 36A, 37A, 36B, 37B and the motor 106. Control programs necessary for slip control and different kinds of control maps are stored in the ROM, while different kinds of memories necessary for carrying out the control are stored in the RAM. The control unit UTR has a timer T.

Contents of the Slip Control

The contents of the slip control by the control unit UTR will be described hereinafter with reference to FIG. 3.

Figure 3:
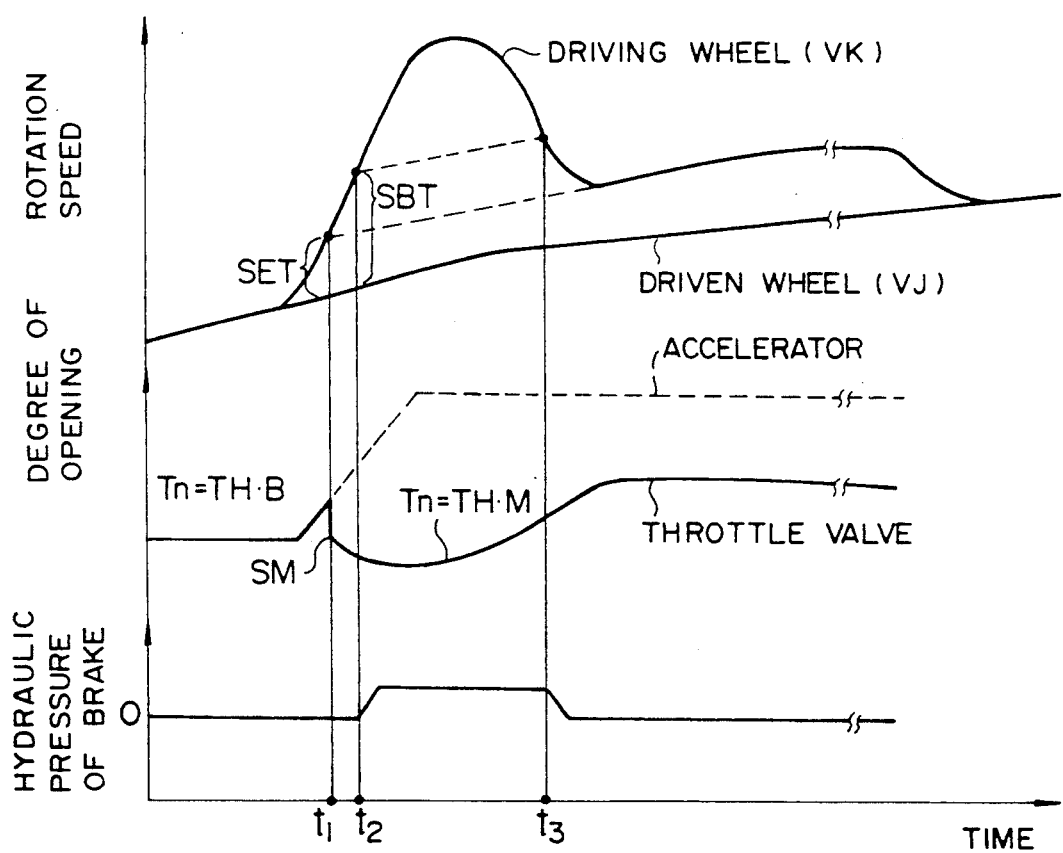
FIG. 3 is a time chart showing the outline of the slip control.

FIG. 3 shows the contents of the slip control comprising the engine control and the brake control. In FIG. 3, the set value of the slip used in the engine control is denoted by SET, and the set value of the slip used in the brake control is denoted by SBT. SBT is set larger than SET. In the above description, the term "slip" means the difference between the rotation speed of the driving wheel and that of the driven wheel.

Figure 9:
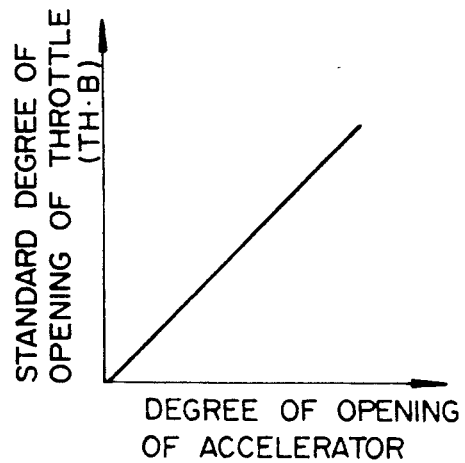
FIG. 9 is a standard throttle opening diagram.

Before the time $t_1$, the slip is small so that the throttle opening Tn is controlled depending on the accelerator opening, that is the throttle opening Tn is made TH·B, a standard throttle opening, in accordance with a standard throttle opening diagram shown in FIG. 9.

At the time $t_1$, when the slip becomes the set value SET, the slip control by engine control is started. First, the throttle opening Tn is reduced to a lower limit value SM, and then, the throttle opening Tn is controlled by feedback so as to maintain the value of the slip to be SET. During this control, the throttle opening Tn is made TH·M, that is the throttle opening Tn is made to be the value controlled by the motor 106. As described above, TH·M is smaller than TH·B.

At the time $t_2$, when the slip becomes the set value SBT, the hydraulic pressure is supplied to the brakes 21RR, 21RL for the respective driving wheel 1RR, 1RL so that the slip control by both the engine control and the brake control is started. The hydraulic pressure supplied to the brakes 21RR, 21RL is controlled by feedback so as to maintain the value of the slip to be SBT.

At the time $t_3$, when the slip becomes smaller than the set value SBT, the hydraulic pressure supplied to the brakes 21RR, 21RL is reduced to zero, and the slip control by the brake control is finished. However, the slip control by the engine control is still continued until the accelerator opening is reduced to zero.

Detailed Description of the Slip Control

Figure 5:
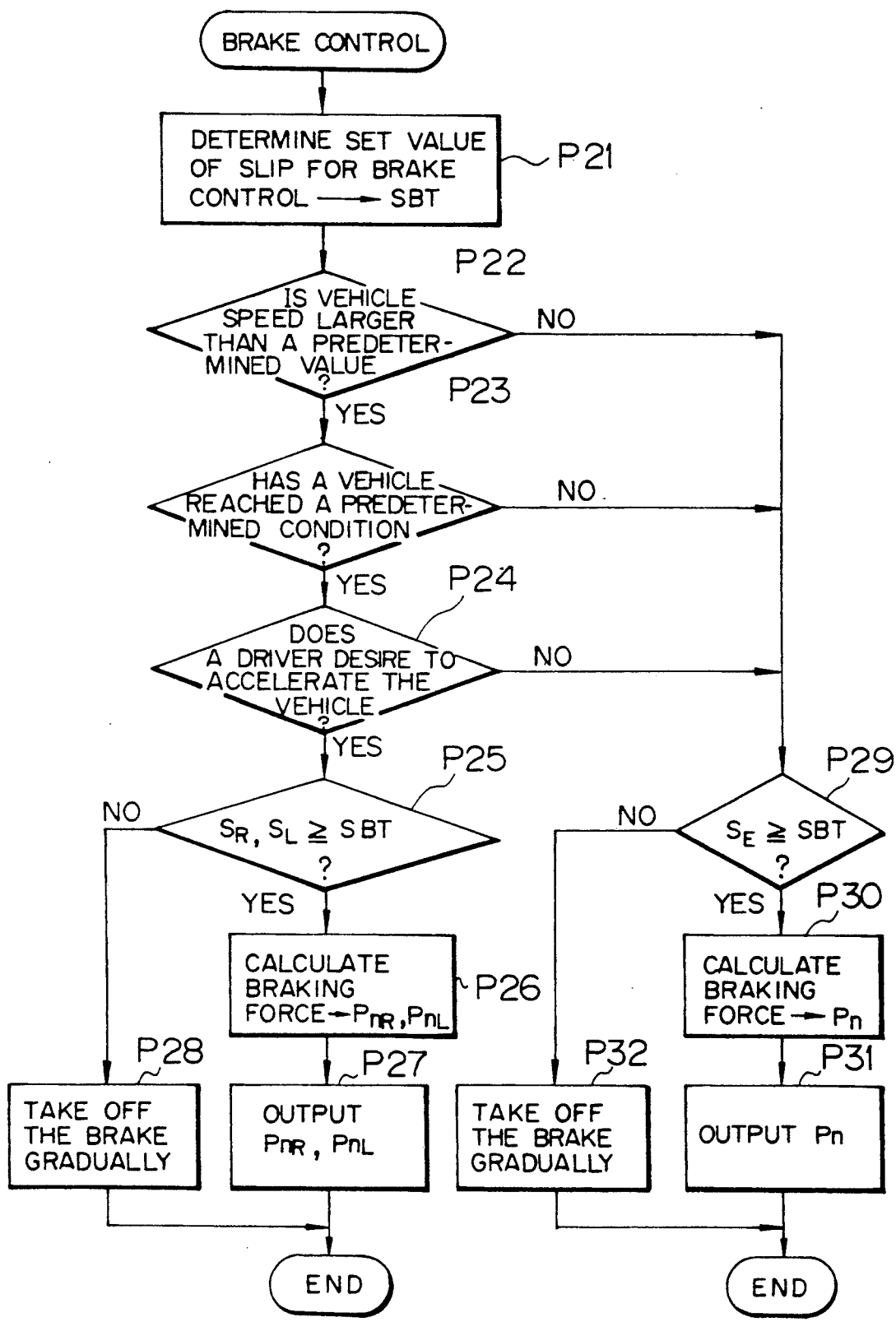
Figure 6:
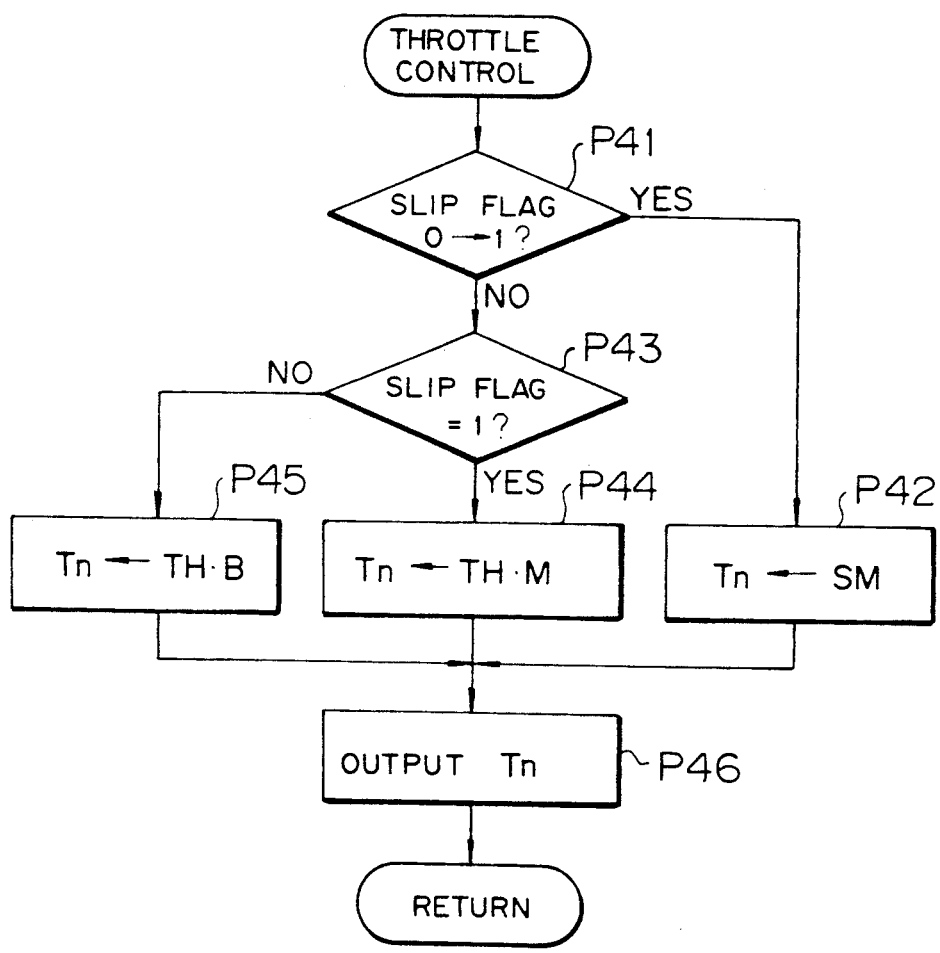

The slip control by the control unit UTR will be described hereinafter in detail with reference to the flowcharts shown in FIGS. 4~6. The reference leter P indicates a step in the flow of the control.

(1) Main Control

The contents of the main control will be described with reference to FIG. 4.

The slip control is started as soon as the acceleration pedal is pushed.

First, the signals from the sensors are input (P1).

Then, it is judged whether the control unit UTR has any trouble or not (P2). There are various kinds of troubles, wherein memory means incorporated in the control unit UTR are wrong, that is data can not be read out of ROM or the data read out of ROM are wrong, or wherein data can not be written into RAM or the data read out of RAM are wrong, etc.

If the control unit UTR has trouble, the slip control is stopped, and then, a trouble signal is output (P10~P11). That is, if the slip control is being carried out, the hydraulic pressure for the brake control is reduced to zero and the throttle opening is controlled depending on the accelerator opening. Then, a trouble signal is sent out by using lamps, buzzers, etc.

If the control unit UTR has no trouble, based on the wheel rotation speed signals from the sensors 63~66, the slip value is calculated by subtracting the rotation speed of the driven wheel VJ from the rotation speed of the driving wheel VK (P3). In this calculation, the slip value $S_R$ for the right driving wheel is calculated by subtracting the rotation speed VJ which is the average of the respective speeds of both of the driven wheels from the rotation speed $VK_R$ of the right driving wheel, while the slip value $S_L$ for the left driving wheel is calculated by subtracting the rotation speed VJ, which is the average of the respective speeds of both of the driven wheels, from the rotation speed $VK_L$ of the left driving wheel for the brake control. For the engine control, the larger of the values $S_R$ and $S_L$ is used as the slip value $S_E$ for the engine control.

Then, based on the accelerator opening signal from the sensor 67, it is judged whether the accelerator opening is zero or not (P4). If the accelerator opening is not zero, then it is judged whether the slip control by the engine control is being carried out or not (P5). If the slip control by the engine control is being carried out, then the slip control proceeds to the brake control (P8). If the slip control by the engine control is not being carried out, then it is judged whether or not the slip value $S_E$ of the driving wheel is larger than or equal to SET (P6). If the slip value $S_E$ of the driving wheel is larger than or equal to SET, the lower limit of the throttle opening SM is set in a way to be described later and it is memorized that the slip control by the engine control is being carried out (P7). Then, the slip control proceeds to a brake control to be described later (P8).

After the brake control is carried out, an engine control to be described later is carried out (P9).

If the accelerator opening is zero, the slip control is ended (P12).

(2) Brake Control

The contents of the brake control will be described with reference to FIG. 5.

First, as will be described later, the set value of slip SBT used in the brake control is determined (P21). Then it is judged whether the vehicle speed is equal to or larger than a predetermined value or not (P22). If the vehicle speed is equal to or larger than a predetermined value, then it is judged whether the vehicle has reached a predetermined condition (P23). The following conditions will be cited as examples of the predetermined condition.

① A predetermined time period has passed after the vehicle started to run.

A measurement of the time period is carried out by the timer T set in the control unit UTR.

② An acceleration of the vehicle has reached a predetermined value.

The acceleration of the vehicle is calculated by dividing a difference in the vehicle speeds between that in the last slip control and that in the present slip control by an elapsed time between the last slip control and the present slip control. The acceleration of the vehicle may be obtained based on acceleration signals from acceleration sensors provided on the vehicle.

③ A speed of the vehicle has reached a predetermined value.

The predetermined value in this case is set larger than that in the step P22.

If the results of the judgements in the steps P22, P23 are yes, the control unit UTR judges that the vehicle has been out of an initial accelerating condition just after the starting of the vehicle, and then judges whether a driver desires to accelerate the vehicle (P24). This judgement is carried out as follows. That is, a depression speed of the acceleration pedal is calculated by dividing a difference in the amounts of the depression of the acceleration pedal between that in the last slip control and that in the present slip control by an elapsed time between the last slip control and the present slip control. If the depression speed of the acceleration pedal is equal to or larger than a predetermined value, the control unit UTR judges that the driver desires to accelerate the vehicle, and if not, the control unit UTR judges that the driver does not desire to accelerate the vehicle.

If the result of the judgement in the step P24 is yes, then an independent brake control is carried out, that is, the respective braking forces on the right and the left driving wheels are controlled independently from each other in accordance with the respective slip values of the right and the left driving wheels. That is, if the slip value $S_R$ of the right driving wheel is larger than or equal to SBT (P25), the braking force $Pn_R$ necessary for reducing the slip value of the right driving wheel to SBT (or opening of the valves 37A, 38B) is determined (P26), and then control signals are provided for the valves in response to the determined braking force $Pn_R$ (P27). If the slip value $S_R$ of the driving wheel is smaller than SBT, then the braking force on the right driving wheel is gradually reduced (P28). At the same time, the same controls as in the step P25~P28 are also carried out on the left driving wheel.

If the vehicle speed has not reached the predetermined value (P22), or the vehicle has not reached the predetermined running condition (P23), the control unit UTR judges that the vehicle has not yet been out of the initial accelerating condition just after the starting of the vehicle, and carries out united brake control, that is the control unit UTR provides the right and the left driving wheels respectively with the same amount of the braking force. The control unit UTR, even if it judges that the vehicle has been out of the initial accelerating condition just after the starting of the vehicle, provided it judges that the driver does not desire to accelerate the vehicle, provides the right and the left driving wheels, respectively, with the same amount of the braking force. The reason for this control is as follows. In the united brake control, the right and the left driving wheels are provided, respectively, with a braking force derived from the larger of the slip values of both driving wheels, so that a larger braking force is provided on the driving wheels as compared with that in the independent brake control, and thus the stability of the vehicle increases as compared with that in the independent brake control though the acceleration performance decreases as compared with that in the independent brake control. Considering the above, even if the vehicle has been out of the initial accelerating condition just after the starting of the vehicle, provided the driver does not desire to accelerate the vehicle, the control unit choose to stabilize the vehicle rather than accelerate the vehicle.

The united brake control is carried out as follows.

First, it is judged whether or not the slip value $S_E$ of the driving wheel is equal to or larger than SBT (P29). If the slip value $S_E$ of the driving wheel is equal to or larger than SBT, the braking force Pn necessary for reducing the slip value to SBT (or opening of the valves 36A, 36B, 37A, 37B) is determined (P30), and then, control signals are provided for the valves 36A, 36B, 37A, 37B in response to the determined braking force Pn (P31). That is, based on the slip value $S_E$, which is the larger one of the two slip values $S_R$ and $S_L$, the former being the slip value of the right driving wheel and the latter being the slip value of the left driving wheel, the braking force Pn necessary for reducing the slip value $S_E$ to SBT is provided on the right and the left driving wheels. If the slip value $S_E$ of the driving wheel is smaller than SBT, the braking force provided on the right and the left driving wheels is gradually reduced (P32).

③ Engine Control

The contents of the engine control will be described with reference to FIG. 6.

Figure 4:
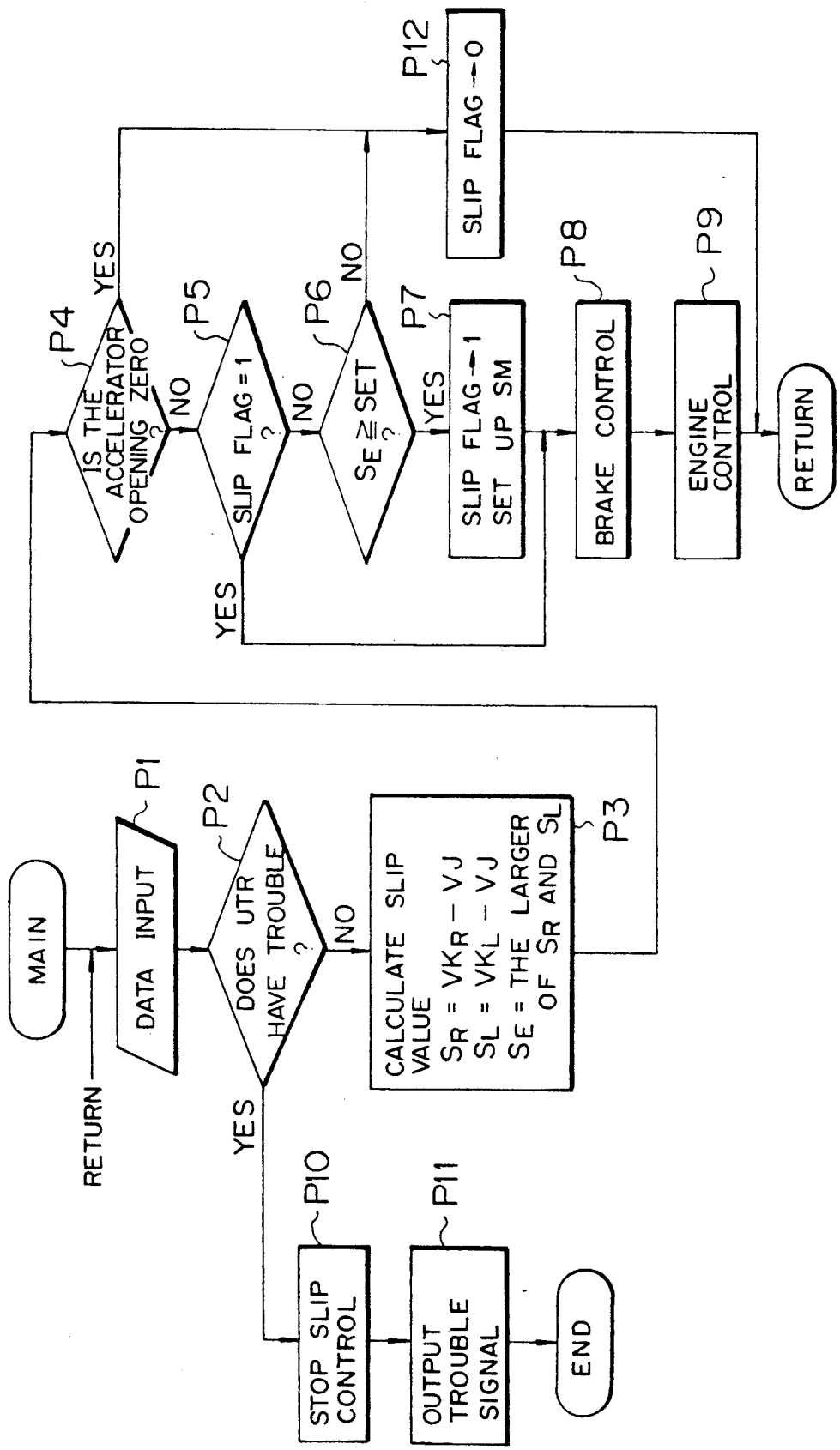
FIGS. 4–6 are flowcharts showing the slip control in accordance with the present invention.

The engine control is carried out by breaking into the main control shown in FIG. 4 at predetermined time intervals. First, it is judged whether the time is $t_1$ shown in FIG. 3 or not (P41). If the time is $t_1$ shown in FIG. 3, the throttle opening Tn is set to be the lower limit value SM, which is determined in a way to be described later (P42).

If the time is not $t_1$ shown in FIG. 3, it is judged whether the slip control is being carried out or not (P43). If the slip control is being carried out, the throttle opening Tn is set to be TH·M (P44). If the slip control is not being carried out, the throttle opening Tn is set to be TH·B (P45), that is the throttle opening Tn is controlled depending on the accelerator opening, in accordance with a standard throttle opening diagram shown in FIG. 9.

After the control steps described above, the motor 106 is driven so as to achieve the set value Tn of the throttle opening (P46).

Set Values of Slip SET, SBT for Slip Control and the Lower Limit SM of the Throttle Opening The determination of the set values SET, SBT for engine control, brake control and the lower limit SM of the throttle opening will be described hereinafter.

Figure 7:
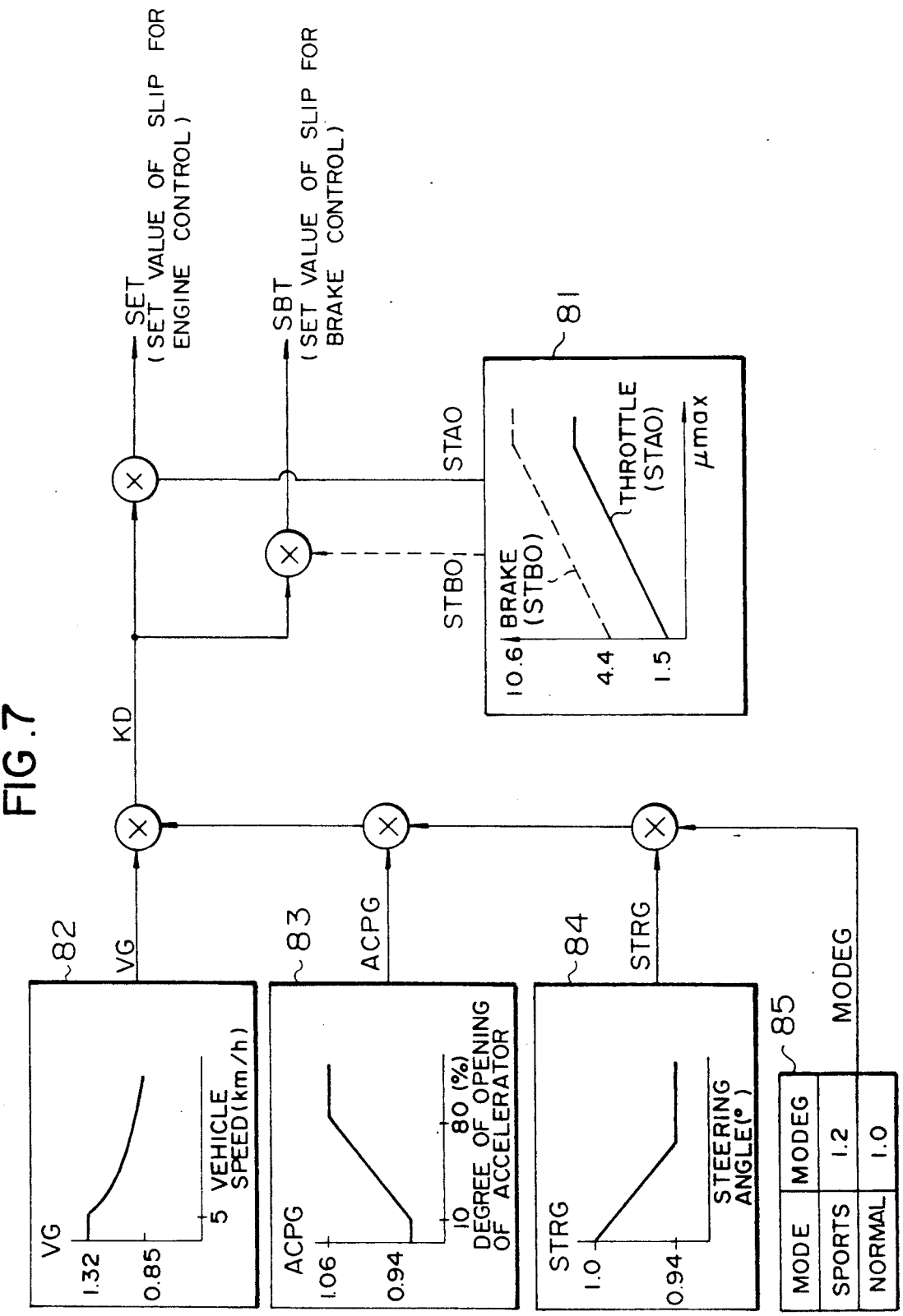
FIG. 7 is a circuit diagram for determining set values of the slip.

FIG. 7 is a block diagram showing the procedure for determining the set values SET, SBT. The set values SET, SBT are determined based on the parameters such as vehicle speed, accelerator opening, steering angle, position of the mode switch 70 and the maximum road friction coefficient $\mu$max. As shown in FIG. 7, standard values STAO, STBO of the set value SET, SBT are given by a map 81 as functions of the maximum road friction coefficient $\mu$max. The standard value STBO is set larger than the standard value STAO. The set values SET, SBT are respectively obtained by multiplying the standard values STAO, STBO by the correction gain KD.

The correction gain KD is obtained by multiplying gain coefficient VG by gain coefficients ACPG, STRG, MODEG. The gain coefficient VG is given by a map 82 as a function of the vehicle speed. The gain coefficient ACPG is given by a map 83 as a function of the accelerator opening. The gain coefficient STRG is given by a map 84 as a function of the steering angle. The gain coefficient MODEG is given by a table 85 and is manually selected by the driver. As shown in FIG. 7, two modes, i.e., a sports mode and a normal mode, are set in the table 85.

Figure 8:
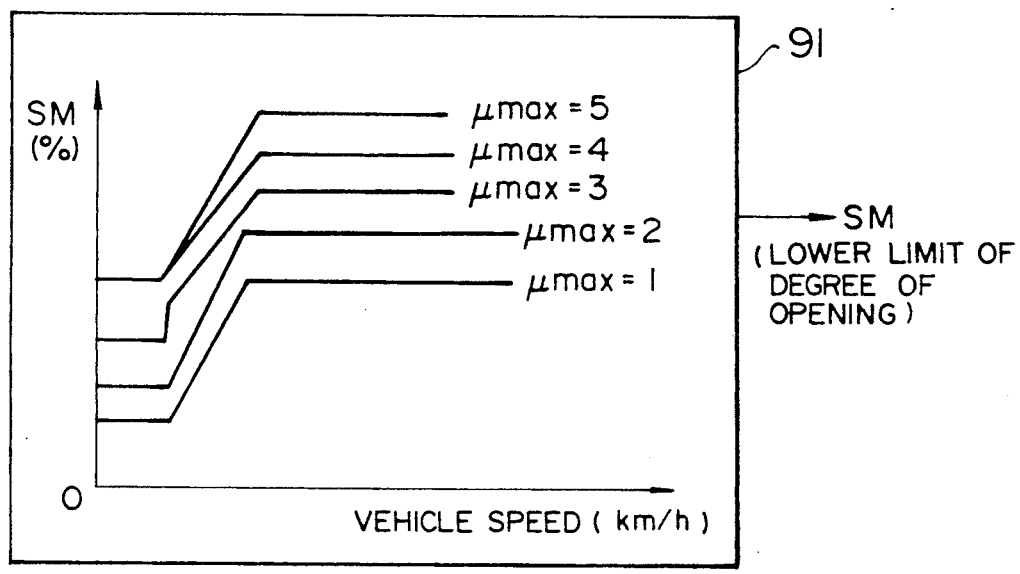
FIG. 8 is a map for determining the lower limit of the degree of the throttle opening in the slip control.

As shown in FIG. 8, the lower limit SM of the accelerator opening is given by a map 91 as a function of the vehicle speed and the maximum road friction coefficient $\mu$max. In FIG. 8, the maximum road friction coefficient $\mu$max is smallest when it is equal to 1 and is largest when it is equal to 5.

The maximum road friction coefficient $\mu$max may be manually set by the driver, but may also be estimated in a way as described below. That is the maximum road friction coefficient $\mu$max may be estimated based on an acceleration obtained by subtracting the rotation speed of the driven wheels at a predetermined time period after the time $t_1$ from the rotation speed of the driven wheels at the time $t_1$, or the maximum road friction coefficient $\mu$max may be estimated based on the maximum acceleration in the last slip control.

We claim:

1. A slip control mechanism of a motor vehicle having driving wheels comprising:
   brake means for applying a braking force to each driving wheel;
   first detection means for detecting slip of each driving wheel;
   second detection means for detecting when a predetermined condition has been met during a starting period of said vehicle; and
   slip control means for determining which driving wheel has a larger slip value and operating the brake means so that each driving wheel is provided with braking force when an excessive slip is detected, based on signals from the first detection means, to thereby eliminate such excessive slip;
   said slip control means controlling the braking force applied by the brake means for respective driving wheels, based on said larger slip value, so that substantially the same amount of braking force is applied to the driving wheels when said second detection means detects that the predetermined condition is not met, and controlling the brake means for the respective driving wheels independently in accordance with signals from the first detection means when said second detection means detects that the predetermined condition is met.

2. A slip control mechanism of a vehicle in accordance with claim 1, wherein
   said second detection means detects that a predetermined period of time has passed after starting of the vehicle.

3. A slip control mechanism of a vehicle in accordance with claim 1 wherein
   said second detection means detects that acceleration of the vehicle has reached a predetermined value.

4. A slip control mechanism of a vehicle in accordance with claim 1 wherein
   said second detection means detects that a speed of the vehicle has reached a predetermined value.

* * * * *